Patented Oct. 20, 1925.

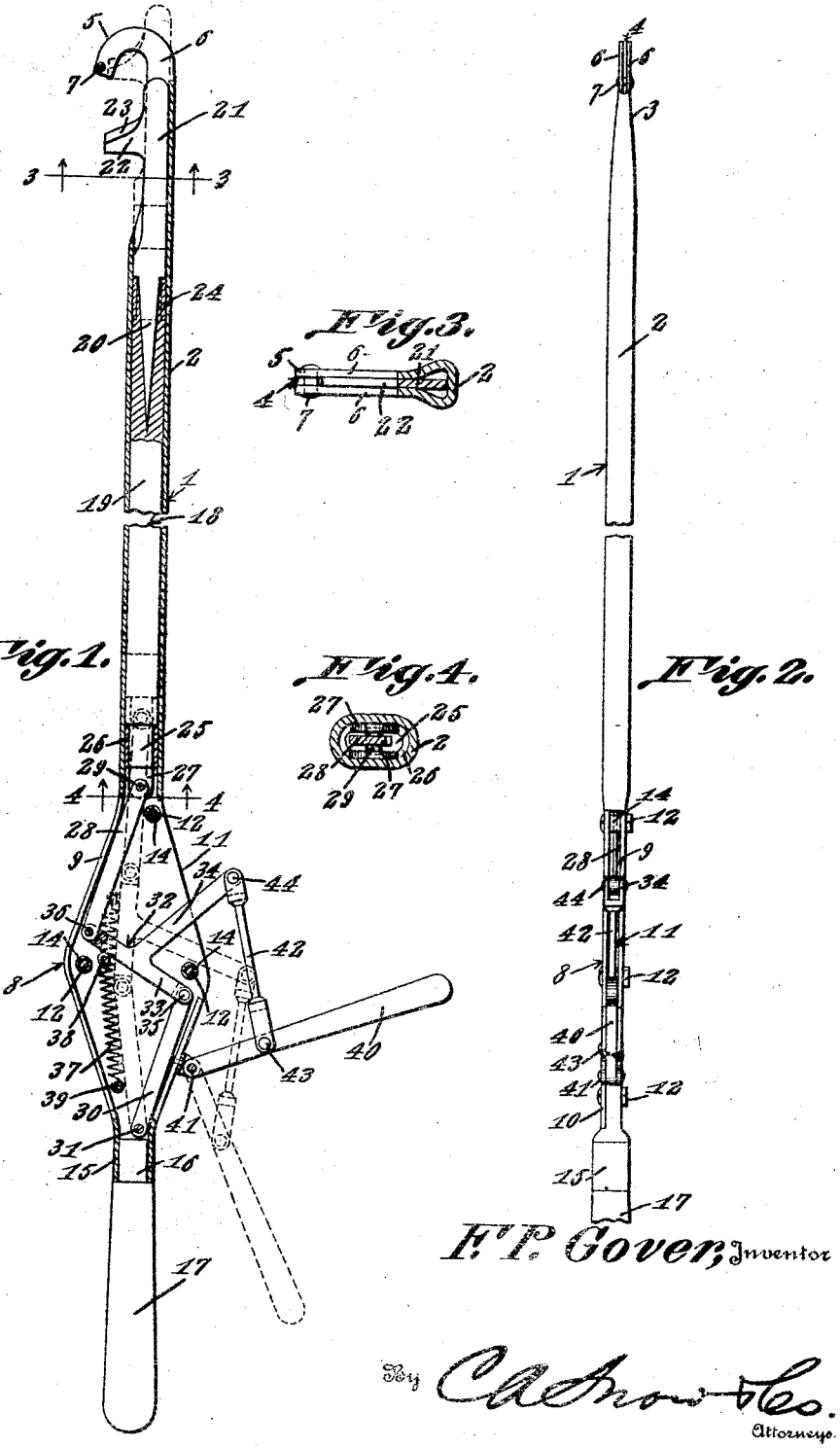

1,557,580

UNITED STATES PATENT OFFICE.

FOUNTAIN P. GOVER, OF EPHRATA, WASHINGTON.

OPERATING MECHANISM FOR PRUNERS.

Application filed April 26, 1924. Serial No. 709,208.

*To all whom it may concern:*

Be it known that I, FOUNTAIN P. GOVER, a citizen of the United States, residing at Ephrata, in the county of Grant and State of Washington, have invented a new and useful Operating Mechanism for Pruners, of which the following is a specification.

This invention aims to provide an operating mechanism for a pruning implement which will possess great strength and have a strong leverage during the cutting operation, the tool being simple and compact in form, and there being small likelihood that the tool will get out of order.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the drawings:—

Figure 1 shows in longitudinal section, a device constructed in accordance with the invention, parts appearing in elevation; Figure 2 is an elevation wherein the tool is viewed at right angles to the showing of Figure 1; Figure 3 is a cross section on the line 3—3 of Figure 1; Figure 4 is a cross section on the line 4—4 of Figure 1.

The tool forming the subject matter of this application comprises a body 1 of any desired length, the body including a tube 2 which is flattened as shown at 3 and split as shown at 4, to form a two-part hood shaped abutment 5, the constituent members 6 of which are united adjacent to their free ends by a securing element 7. The tube 2 merges into a laterally enlarged casing 8 including a main member 9 having an opening 10 in one edge, the casing 8 including a closure plate 11 held on the main member 9 by securing devices 12, such as bolts, passing through tubular spacers 14 interposed between the side wall of the main member 9 of the casing 8 and the closure plate 11 of the casing. At its lower end, the main member 9 is provided with a socket 15 receiving the reduced end 16 of a handle 17.

A plunger, denoted generally by the numeral 18, is mounted for reciprocation in the body 1 and includes a rod 19, made of wood if desired, and received closely but slidably in the tube 2. The upper end of the rod 19 receives the tang 20 of a cutter 21 having an outstanding arm 22 provided with a cutting edge 23 adapted to cooperate with the hook shaped abutment 5. The upper end of the rod 19 is surrounded by a ferrule 24 which reinforces the rod and enhances the hold of the tank 20 of the cutter 21 in the rod.

The lower end of the rod 19 is reduced, as shown at 25 and is received in a ferrule 26 having ears 27. It is to be observed that the ferrules 24 and 26 have an added function, since they slide in contact with the tube 2 and serve as protectors, reducing the wear on the rod 19 when the rod is reciprocated in the tube 2. The numeral 28 marks a first link located in the casing 8. The outer end of the link 28 is pivoted at 29 to the ears 27 on the ferrule 26, the outer end of the link 29 extending between the ears, as shown in Figure 4. The numeral 30 designates a second link located in the casing 8. The outer end of the second link 30 is pivoted at 31 to the main member 9 of the casing 8. A T-shaped operating member 32 is located partly within the casing 8 and includes a head 33 and a shank 34 disposed at an angle to each other, the shank projecting outwardly through the opening 10 in the main member 9 of the casing 8. The inner end of the second link 30 is pivoted at 35 to one end of the head 33 of the operating member 32. The inner end of the first link 28 is pivoted at 36 to the other end of the head 33. A retractile spring 37 is located in the casing 8. One end of the retractile spring 37 is connected at 38 to the head 33 of the operating member 32 at a point adjacent to the pivotal connection 36 between the head and the link 38. The opposite end of the spring 37 is connected at 39 to the main member 9 of the casing 8.

A lever 40 is located outside of the casing 8, one end of the lever being fulcrumed at 41 on the casing. The numeral 42 designates a third link. One end of the third link 42 is pivoted at 43 to the intermediate portion of the lever 40, and the other end of the third link is pivoted at 44 to the outstanding end of the shank 34 of the operating member 32.

In practical operation, the hook shaped abutment 5 is engaged over the limb which is to be severed. The lever 40 is swung downwardly on its fulcrum 41, and the third link 42 imparts the swinging movement to the operating member 32. The links 28 and 30 swing in opposite directions, toward alinement, on their respective pivotal mountings 29 and 31, the head 33 of the operating member 32 moving toward alinement with the links 28 and 30, a toggle joint being afforded, which gives a powerful leverage, the rod 19 being moved upwardly, and the cutting edge 23 of the arm 22 on the member 21 cooperating with the abutment 5 to sever the branch. When the tool is operated in the way above described, the retractile spring 37 is extended, and the spring, reacting, tends to restore the parts of the tool from the dotted line position of Figure 1 to the solid line position of that figure.

Having thus described the invention, what is claimed is:—

1. Mechanism for operating a plunger, comprising a body, a plunger slidable in the body, an operating member comprising a head and a shank disposed at an angle to each other, oppositely extended links having their outer ends pivoted respectively to the body and to the plunger, the inner ends of the links being pivoted to the ends of the head of the operating member, the operating member being freely movable in the body, to permit the head of the operating member to move toward alinement with the links when the plunger is advanced, and a retractile spring having its ends connected to the body and to the head of the operating member and constituting means for retracting the plunger.

2. A device of the class described, constructed as set forth in claim 1, and further characterized by the provision of a lever fulcrumed on the body, and a link pivoted to the lever and to the outer end of the shank of the operating member.

In testimony that I claim the foregoing as my own, I have hereto affixed my signature.

FOUNTAIN P. GOVER.